(12) United States Patent
Manteufel et al.

(10) Patent No.: US 8,910,544 B2
(45) Date of Patent: Dec. 16, 2014

(54) CAM PART FOR A VARIABLE SLIDING CAM VALVE DRIVE

(71) Applicant: Schaeffler Technologies AG & Co. KG, Herzogenaurach (DE)

(72) Inventors: Arne Manteufel, Bamberg (DE); Andreas Biermann, Herzogenaurach (DE)

(73) Assignee: Schaeffler Technologies GmbH & Co. KG, Herzogenaurach (DE)

(*) Notice: Subject to any disclaimer, the term of this patent is extended or adjusted under 35 U.S.C. 154(b) by 6 days.

(21) Appl. No.: 13/784,891

(22) Filed: Mar. 5, 2013

(65) Prior Publication Data

US 2013/0247711 A1 Sep. 26, 2013

(30) Foreign Application Priority Data

Mar. 22, 2012 (DE) .......... 10 2012 204 621

(51) Int. Cl.
| | | |
|---|---|---|
| *F16H 53/00* | (2006.01) | |
| *F01L 1/04* | (2006.01) | |
| *F16H 25/12* | (2006.01) | |
| *F01L 1/08* | (2006.01) | |
| *F16H 53/02* | (2006.01) | |
| *F01L 13/00* | (2006.01) | |

(52) U.S. Cl.
CPC . *F16H 25/12* (2013.01); *F01L 1/08* (2013.01); *F01L 2013/0052* (2013.01); *F01L 13/0042* (2013.01); *F16H 53/02* (2013.01)
USPC .......................................... 74/567; 123/90.6

(58) Field of Classification Search
CPC ............ F16H 25/12; F16H 53/00; F01L 1/08; F01L 1/047
USPC .......... 74/567, 568 R; 123/90.15–90.18, 90.6
IPC ................. F16H 53/00; F01L 1/08, 1/047, 1/34
See application file for complete search history.

(56) References Cited

U.S. PATENT DOCUMENTS

| | | | | |
|---|---|---|---|---|
| 7,219,638 | B2 * | 5/2007 | Mueller-Frank | 123/90.21 |
| 7,404,383 | B2 * | 7/2008 | Elendt | 123/90.16 |
| 8,025,003 | B1 * | 9/2011 | Saur | 89/14.05 |
| 8,186,320 | B2 * | 5/2012 | Schiepp et al. | 123/90.18 |
| 8,191,524 | B2 * | 6/2012 | Elendt et al. | 123/90.6 |
| 8,365,692 | B2 * | 2/2013 | Schoeneberg et al. | 123/90.18 |
| 8,584,639 | B2 * | 11/2013 | Elendt et al. | 123/90.18 |
| 8,607,750 | B2 * | 12/2013 | Parsche | 123/90.16 |
| 8,707,917 | B2 * | 4/2014 | Schiepp | 123/90.16 |

FOREIGN PATENT DOCUMENTS

DE 102009048621 4/2011

* cited by examiner

*Primary Examiner* — Thomas Diaz
*Assistant Examiner* — Adam D Rogers
(74) *Attorney, Agent, or Firm* — Volpe and Koenig, P.C.

(57) ABSTRACT

A cam part (1) is provided for a variable sliding cam valve drive of an internal combustion engine, which cam part (1) can be mounted on a basic shaft of the sliding cam valve drive fixedly so as to rotate with it but axially displaceably, and has one or more cam groups (2, 3) and at least one connecting link piece (4) with at least one spiral groove (5) for an actuator pin engagement. At least one weight-reducing groove (7) which does not coincide with the spiral groove (5) is formed on the outer casing (6) of the cam part (1).

4 Claims, 3 Drawing Sheets

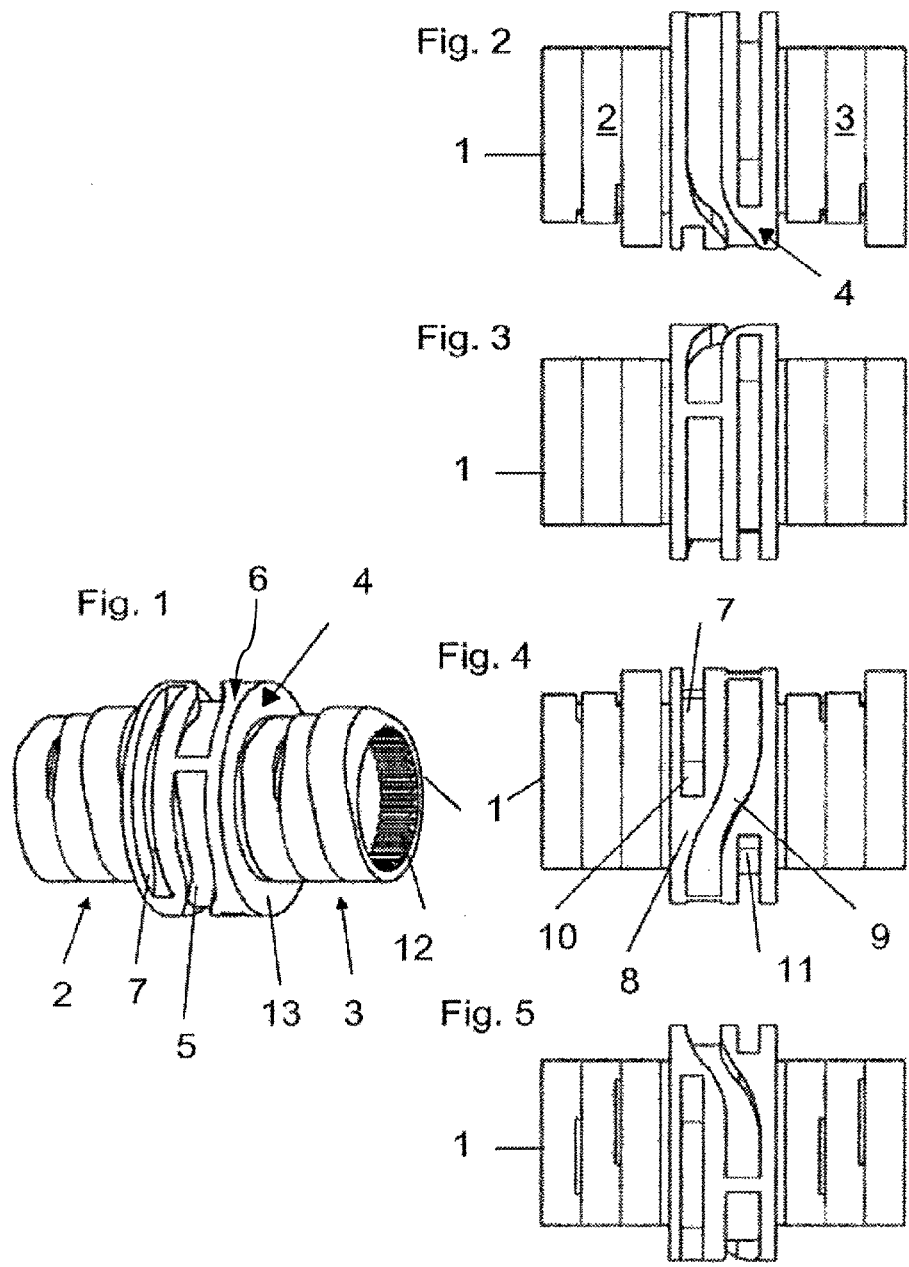

CAM PART FOR A VARIABLE SLIDING CAM VALVE DRIVE

INCORPORATION BY REFERENCE

The following documents are incorporated herein by reference as if fully set forth: German Patent Application No. 102012204621.6, filed Mar. 22, 2012.

BACKGROUND

The invention relates to a cam part for a variable sliding cam valve drive of an internal combustion engine, which cam part can be mounted on a basic shaft of the sliding cam valve drive fixedly so as to rotate with it but axially displaceably, and has one or more cam groups and at least one connecting link piece with at least one spiral groove for an actuator pin engagement.

A cam part of this type is disclosed in DE 10 2009 048 621 A1. It is disadvantageous that comparatively high displacement forces are necessary due to its mass and therefore inertia. The actuator pin, actuator, spiral groove, etc. are therefore subjected to correspondingly high loading as a result of respective shear and displacement forces. Unnecessarily high wear occurs during operation, which wear is greater the shorter, for example, the available circumferential displacement region of the spiral groove, for instance, inter alia, in the case of a double S spiral groove (three lifting cams) or in the case of a cam part with two sliding groups, as can be gathered from the abovementioned document, purely for reasons of mass.

SUMMARY

It is therefore an object of the invention to reduce the above-described high loads and the wear by way of simple measures concerning the cam part.

According to the invention, this object is achieved by the fact that at least one weight-reducing groove which does not coincide with the spiral groove is formed on the outer casing of the cam part.

The at least one groove according to the invention reduces the mass of the cam part and therefore the forces which are necessary during its temporally cyclical displacement on a basic shaft. Wear phenomena on the spiral groove and on the actuator pin are reduced considerably. This actuator pin can possibly be of smaller dimensions. Moreover, it is possible to realize fast switching times, despite a short displacement region of the spiral groove (double S design).

Also included in the scope of protection of said invention is a solution, in which the at least one groove is applied in a targeted manner to the inner ring of the cam part and is present separately to one or more latching grooves for a latching body engagement for fixing the cam part. This variant can also be present together with an application of the grooves on the outer ring of the cam part.

A plurality of grooves are preferably provided per cam part, with the result that there is a particularly lightweight design. It is proposed here in one specific embodiment of the invention to place two or more grooves axially next to one another, which grooves are separated by a web (remaining residual material). The web can also be attached retrospectively.

It is expedient if the at least one groove has such a design that unintentional retraction of the actuator pin is ruled out. This can be realized by way of its width which is smaller than the width of the spiral groove in the displacement region or, in other words, is narrower than the engagement region of the actuator pin.

However, it is also provided in this context to provide the groove with other types of measures such as thin-walled covers, etc., via which a retraction of the actuator pin is likewise ruled out.

The at least one groove can, but does not have to be present in an all-encompassing form. Since the connecting link piece is already as a rule as narrow as possible, the at least one groove ends at a displacement region of the spiral groove, as viewed in the circumferential direction. A region of the respective cam group can also optionally be provided with at least one weight-reducing groove.

It is clear that, for further wear reduction, the region of the spiral groove can be provided with suitable applied layers such as CVD, PVD, inter alia, also galvanically applied material.

According to the invention, a cam part comprises at least one group, having a connecting link piece and one or two cam groups. One connecting link piece can also have a plurality of spiral grooves, the at least one cam group having at least two lifting cams which are different than one another. A plurality of the groups mentioned at the outset can also form one structural unit and can be separated, for example, by a bearing ring. The cams of at least one group can also run in a phase-offset manner with respect to one another.

According to a further development of the invention, the mass-reducing groove can have a U-shaped, T-shaped, V-shaped profile or a profile in the manner of a hollow channel.

BRIEF DESCRIPTION OF THE DRAWINGS

In the drawings:

FIG. 1 shows a three-dimensional view of a first variant of a cam part,

FIGS. 2-5 show the cam part according to FIG. 1 in different rotational views.

DETAILED DESCRIPTION OF THE PREFERRED EMBODIMENTS

Figure 7:
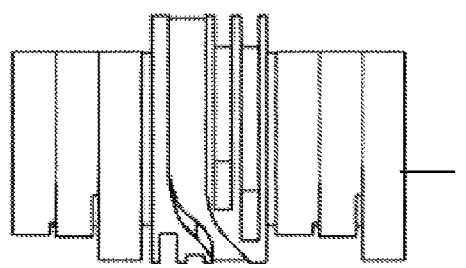
FIGS. 7-10 show the cam part according to FIG. 6 in different rotational views.
Figure 8:
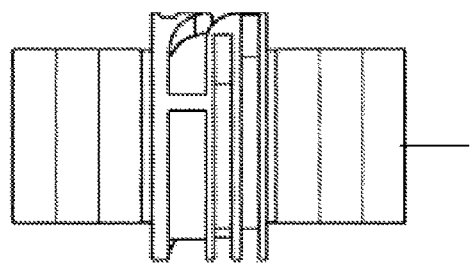
Figure 9:
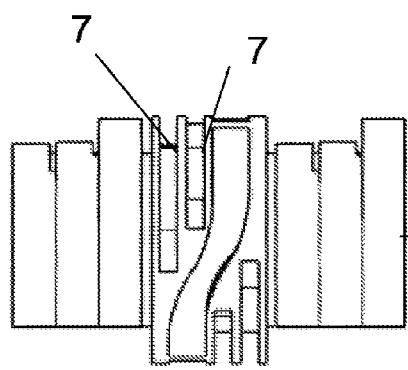
Figure 6:
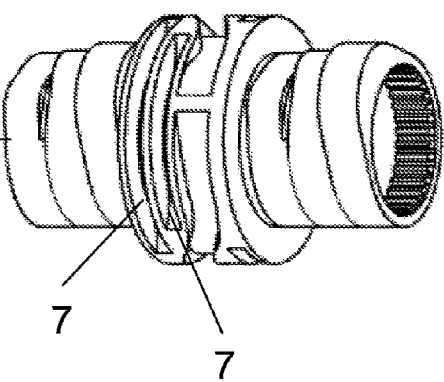
FIG. 6 shows a further variant of the cam part.
Figure 10:
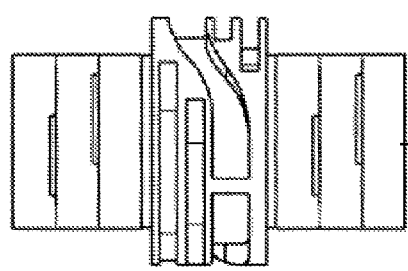

With respect to FIGS. 1-5:

A cam part 1 is shown for a variable sliding cam valve drive of an internal combustion engine. The cam part 1 can be mounted on a basic shaft (not shown) of the sliding cam valve drive fixedly so as to rotate with it but axially displaceably via an internal toothing system 12 (see FIG. 1). It has a middle connecting link piece 4 with a spiral groove 5 in a double S shape for an actuator pin engagement. A cam group 2, 3, with in each case three different cams, is seated on each side of the connecting link piece 4.

In order to reduce the mass of the cam part 1, said cam part 1 has two grooves 7 on its outer casing 6, which grooves 7 are of U-shaped cross section, run around in a segment-like manner and can be gathered well, for example, from FIG. 4. More accurately, each groove 7 runs on an outer ring 8 of the connecting link piece 4 close to its outer face 13. The two grooves 7 are offset circumferentially with respect to one another and enclose the spiral groove 5 axially.

It can be seen that each groove 7 extends circumferentially with its entry and exit region 10, 11 to such an extent that, as viewed in the axial direction of the cam part 1, it is adjacent to a displacement region 9 of the spiral groove 5.

With respect to FIGS. 6-10:

The difference from the above-described design lies in the fact that in each case two grooves 7 which lie on each side of the spiral groove 5 are applied here such that they are adjacent to one another axially.

In both variants (FIGS. 1-5 and FIGS. 6-10), the respective groove 7 is narrower than a diameter of the actuator pin, with the result that the unintended engagement thereof is not made possible.

Figure 11:
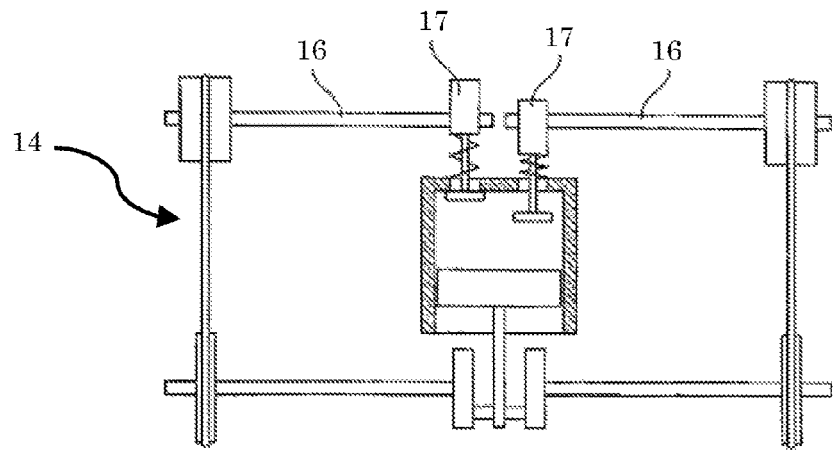
FIG. 11 shows a schematic view of an internal combustion engine.
Figure 12:
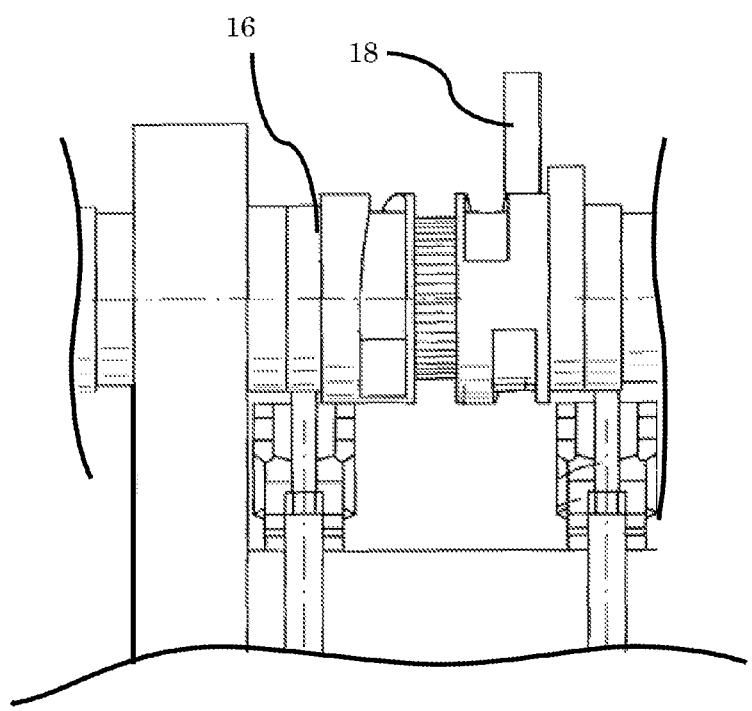
FIG. 12 shows a camshaft with an actuator pin.

FIG. 11 shows a schematic view of an internal combustion engine 14 according to the prior art. FIG. 11 shows camshafts 16 and cams 17. FIG. 12 shows a camshaft 16 with an actuator pin 18 according to the prior art.

The invention claimed is:

1. A cam part for a variable sliding cam valve drive of an internal combustion engine, said cam part can be mounted on a basic shaft of the sliding cam valve drive fixedly so as to rotate with the basic shaft and is axially displaceable, the cam part comprising at least one cam group and at least one connecting link piece with at least one spiral groove for engagement with an actuator pin, and two weight-reducing grooves on an outer casing of the cam part each extend partially around the outer casing of the cam part, the two weight-reducing grooves are offset circumferentially with respect to one another and axially enclose the at least one spiral groove, and the two weight-reducing grooves do not coincide with the at least one spiral groove.

2. The cam part as claimed in claim 1, wherein an entry or an exit region of the weight-reducing grooves or both the entry and the exit regions extend circumferentially to such an extent of the weight-reducing grooves that, as viewed in an axial direction of the cam part, the entry or exit regions or both the entry and exit regions are adjacent to a displacement region of the at least one spiral groove.

3. The cam part as claimed in claim 1, wherein the weight-reducing grooves are narrower than the at least one spiral groove in a displacement region thereof, or wherein the weight-reducing grooves are present in such a way that they do not permit the actuator pin to engage therein.

4. The cam part as claimed in claim 1, wherein the at least one connecting link piece comprises a single connecting link piece that is flanked on both sides by two or more of the cams from the at least one cam group.

\* \* \* \* \*